United States Patent [19]

Mizuochi

[11] 4,025,674
[45] May 24, 1977

[54] REFLEX LIGHT REFLECTING SHEET

[75] Inventor: Hisayuki Mizuochi, Sano, Japan

[73] Assignee: Seibu Polymer Kasei Kabushiki Kaisha, Tokyo, Japan

[22] Filed: Sept. 12, 1975

[21] Appl. No.: 612,693

[30] Foreign Application Priority Data

June 6, 1975 Japan ............... 50-068203

[52] U.S. Cl. .................. 428/29; 428/204; 428/325; 428/210; 427/163; 40/137; 40/130 B

[51] Int. Cl.$^2$ .................. G23F 13/02; G23F 13/14

[58] Field of Search ........ 428/204, 325, 29; 427/163; 40/137, 130 B, 125 R, 125 N, 125 D

[56] References Cited

UNITED STATES PATENTS

| | | | |
|---|---|---|---|
| 2,827,720 | 3/1958 | Phillippi | 40/137 |
| 3,247,005 | 4/1966 | Parry et al. | 427/163 |

*Primary Examiner*—Ralph S. Kendall
*Attorney, Agent, or Firm*—Brisebois & Kruger

[57] ABSTRACT

A reflex light reflecting sheet or reflective structure whereby incident light is reflected from a reflective layer on the rear of the structure through a plurality of small transparent balls, wherein a surface coating layer which is transparent and flat is formed over the surfaces of said balls, said layer being composed of two sub-layers between which is provided a printed portion using fine lines for printing, such that the printed portion is visible in scattered light in the daytime but invisible in reflected light in the nighttime.

10 Claims, 4 Drawing Figures

REFLEX LIGHT REFLECTING SHEET

BACKGROUND OF THE INVENTION

This invention relates to a reflex light reflecting sheet, and more particularly to a reflex light reflecting sheet having a printed portion, the printed portion being visible under scattered light in the daytime but invisible in the nighttime.

BRIEF DESCRIPTION OF THE PRIOR ART

In currently used reflex light reflecting sheet, the printed portion for reflecting the incident light is provided behind the small transparent balls in the reflecting sheet. Therefore, when high-brightness reflection is required, it is necessary to form print on the mirror surfaces concentric with the small transparent balls. In other words, it is necessary to apply uniform printing on a plurality of concave mirror surfaces. It is, however, extremely difficult to accomplish this on such surface portions which do not lie on the same plane. Thus, a certain decline in brightness has been considered inevitable in conventional reflex light reflecting sheet.

SUMMARY OF THE INVENTION

The present invention has solved these problems of the prior art, and has as its object to provide a novel reflex light reflecting sheet having a printed portion or print which is readily and distinctly visible under scattered light in the daytime but invisible under reflected light in the nighttime, and wherein the printing of said printed portion can be accomplished with ease.

Another object of the present invention is to devise a reflex light reflecting sheet of the type described, wherein a printed portion is provided in a transparent layer which constitutes the surface coating layer of the reflecting sheet.

Still another object of the present invention is to provide a reflex light reflecting sheet of the type described wherein said surface coating layer is composed of two sub-layers and a printed portion is positioned between said two sub-layers.

Yet another object of the present invention is to provide a reflex light reflecting sheet of the said type wherein the printed portion formed in said surface coating layer is formed by lines having a thickness of less than 0.5 mm.

The other objects and advantages of the present invention will become apparent as this invention is more fuly described hereinafter, with reference to the accompanying drawngs, in which.

DETAILED DESCRIPTION OF THE INVENTION

Figure 1:
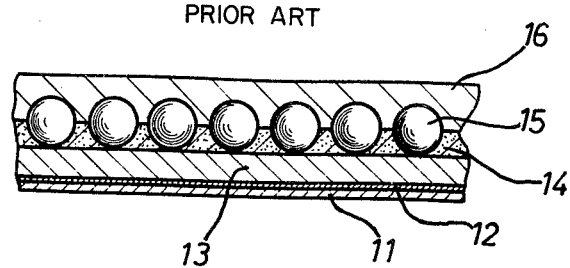
FIG. 1 is a longitudinal sectional view showing a prior art reflex light reflecting sheet.

In currently used reflex light reflecting sheet, as exemplified in FIG. 1, a printed layer 12 is provided on one side of the reflective layer 11, and a sapcing layer 13, a binder layer 14 having embedded therein a plurality of small transparent balls 15, and a surface coating layer 16 are laminated in that order on said printed layer 12. In this reflex light reflecting sheet, the printed layer 12 is composed of particles of a material which allows semi-mirror-reflection, the reflecting layer 11 is composed of a material which allows mirror-reflection, none of the part of the width of the printed layer 12 exceeds about 1/64th of an inch, futher said printed layer 12 is such that its reflective strength in the visible spectrum is 40 to 90% of the total mirror-surface reflection strength shown by the reflecting layer 11 in the visible spectrum, and thereby the printed layer 12 is visible under scattered light in he daytime when viewed from the front of the reflecting sheet through the naked eye but invisible under the reflected light.

However, when a reflex light reflecting sheet with high brightness is required, the internal light reflective layer must be formed as a mirror surface which is concentric with the small transparent balls 15 embedded in front of said layer. Accordingly, in conventional reflex light reflecting sheet, it is required that the printed layer be formed on the mirror surfaces concentric with the small transparent balls or that the printing must be effected uniformly on a plurality of concave mirror surfaces, however, it is extremely difficult to accomplish this uniform printing on the concave mirror surfaces.

Now, a preferred embodiment of the present invention will be described with reference to the figures.

Figure 2:
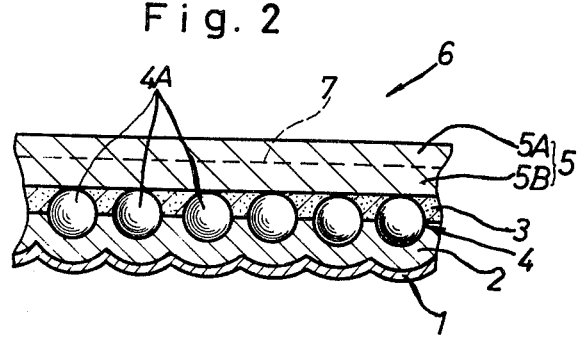
FIG. 2 is a longitudinal sectional view showing a reflex light reflecting sheet according to the present invention.

In FIG. 2, the reflex light reflecting sheet 6 comprises a laminated layer consisting of a surface coating layer 5 which is transparent and flat, a tranparent binder layer 3 at the rear of the said surface coating layer 5, a ball-arranged layer 4 consisting of a plurality of small transparent balls 4A which is partly embedded in said binder layer 3, a transparent spacing layer 2 covering the remaining portions of said ball- arranged layer 4, and a reflective layer 1 at the rear of the spacing layer 2, in that order, the said surface coating layer 5 being composed of two sub-layers 5A, 5B, between the interfacial boundary of which a printed layer 7 is provided. It is desirable to have the small transparent balls 4A half embedded in the binder layer 3. In order to prevent the lowering of the brightness of the reflected light, it is also desirable that the focal point of the small transparent balls 4A is so arranged as to be on the reflective layer 1, and that the spacing layer 2 is provided so as to have the reflective layer 1 at the rear of the layer 2 formed concentrically with the small transparent balls 4A. Both the two layers 5A, 5B constituting the surface coating layer 5 in said reflex light reflecting sheet 6 are formed from transparent thermosetting resin having a refractive index of 1.52, and a weight per unit area of 20 to 23 g/m². The printed layer 7 has a refractive index of 1.52 and is printed with lines less than 0.3 mm in transparent or semitransparent ink by using a printing process such as photogravure printing on one of the two sub-layers 5A or 5B of the surface coating layer 5. The binder layer 3 is also made of transparent thermosetting acrylic resin having a weight per unit area of 25 to 28 g/m².

Each of the small transparent balls 4A is a transparent shperical body with a refractive index of 2.2 and a grain size of 60 to 90 μ. The spacing layer 2 is formed from transparent thermosetting acrylic resin having a refractive index of 1.52 and a weight per unit area of 30 to 35 g/m². The reflective layer 1 is formed by the depositoin of metal such as aluminum having a thickness of 200 A and is integral with the spacing layer 2.

In this embodiment, the printed layer 7 becomes invisible when the reflecting sheet receives reflected light in the nighttime because strong reflected light rays suppress reflections from the printed layer 7 due to the diffraction of light. However, if the width of the lines in the printed layer 7 is greater than a certain value, that part of the light irradiated area which is covered by the printed layer 7 becomes larger than the other part, and hence even when strong reflected light is present, the printed layer 7 can no longer be comletely obscured by the diffracted light, so that the printed layer 7 becomes visible from the outside.

Therefore, the width of the lines in the printed portion used in the present invention must be less than 0.5 mm. Although the printed layer 7 may have from half to complete transparency, it is desirable to maintain transmittance of the printed layer 7 at 70 to 100% of that of other layers. If the transmittance of the printed layer 7 is less than 70% of that of other layers, the light rays transmitted through the printed layer 7 in the nighttime are so reduced that they are unable to completely obscure the printed lines in said portion, even with the aid of diffraction of the reflex reflected light rays that pass through the other layers, and consequently the incompletely obscured portion becomes visible as "shade" and brightness of reflection is lowered, making it impossible to accomplish the object of the present invention.

Although the printing ink and pigment used for printing in the printed layer 7 can range widely in particle size from less than $1\mu$ to about $40\mu$, this particle size must be selected properly according to the color of the reflex light reflecting sheet. If the particle size of pigment is too large, this results in a reduction in transmittance, making it difficult to obscure the letters or such in the printed layer 7 even under reflected light in the nighttime. Thus, there is a certain limitation on the particle size of pigment used in the present invention. In order to prevent the printed layer 7 from swelling during its formation, it is desirable to use thermosetting resin such as alkyd resin or acrylic resin for one of the coating layers 5A or 5B.

Assuming here that the thickness of the layer 5A is $d_1$, the thickness of the layer 5B is $d_2$ and the diameter of each small transparent ball 4A is D, and further assuming that the relationship of $d_1 + d_2 = \frac{1}{2} D$ holds, then it was found desirable to set the relationship of $d_2 \geq D/4$ for certain types of printing ink. The printed layer 7 can be provided at any location within the range spanning from the rear to the front of the surface coating layer 5, but it is necessary to select this location according to the thickness of the ink used or the size of the printed lines. Also, if the distance from the small transparent balls 4A to the printed layer 7 is too great, the light rays which have passed the printed layer 7 may be diffused and become hardly perceptible. And furthermore, in case the width of the printed line is narrow, the printed layer 7 becomes invisible under the reflex reflected light ray from the outside and therefore, the reflex reflected light ray can be uniformly visible.

Figure 3:
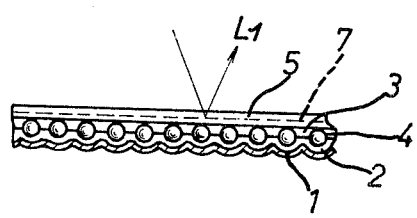
FIGS. 3 and 4 are diagrammatic drawings showing how light is reflected when the reflecting sheet receives scattered light in the daytime and reflected light in the nighttime respectively.
Figure 4:
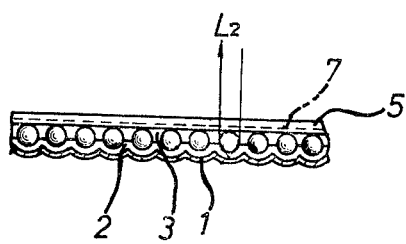

FIG. 3 shows a situation where the printed layer 7 is visible owing to irregular reflection of light L1 when scattered light impinges thereon in the daytime, and FIG. 4 shows a situation where the printed surface is invisible from the outside when viewed under reflected light L2 in the nighttime.

As described above, according to the reflex light reflecting sheet of the present invention, a portion printed with lines less than 0.5 mm in size is provided in the surface coating layer 5 so that such printed layer 7 will be distinctly visible in scattered light in the daytime but invisible in reflected light in the nighttime, thus allowing very easy discernment.

Further, according to the present invention, since it is merely required to do the printing in the surface coating layer 5, such printing can be accomplished with ease, and also, since such printing is done between layers, it is possible to reduce the thickness of the printed layer, thus eliminating any possibility of reducing brightness even when the reflex light reflecting sheet is of high-brightness type.

As is apparent from the foregoing description, the device according to the present invention is easy to manufacture and has many advantages that can never be obtained with conventional devices.

What is claimed is:

1. A laminated reflex light reflecting sheet comprising in succession:
    a flat, transparent surface coating layer,
    a transparent binder layer at the rear of the coating layer,
    a plurality of small transparent balls partially embeddded in said transparent binder layer,
    a transparent spacing layer covering the remaining portions of said balls, and
    a reflective layer at the rear of said spacing layer,
    said surface coating layer containing printing which is visible from the front of said surface coating layer in scattered daytime light, but substantially invisible in reflex reflected light at night, said printing consisting of lines less than 0.5 mm in size and having a transmittance at least 50% as great as the transmittance of said transparent layers.

2. The reflex light reflecting sheet set forth in claim 1, wherein said surface coating layer is composed of two sublayers and said printed portion is provided between said two sub-layers.

3. The reflex light reflecting sheet claimed in claim 2, wherein the two sub-layers constituting said surface coating layer are formed from transparent thermosetting resin having a refractive index of 1.52.

4. The reflex light reflecting sheet set forth claim 1, wherein said printing is made of transparent or semi-transparent ink having a refractive index of 1.52.

5. The reflex light reflecting sheet claimed in claim 2, wherein said printing is photogravured on one of the two sub-layers constituting said surface coating layer.

6. The reflex light reflecting sheet set forth in claim 1, wherein transmittance of said printing is 70 to 100% of the transmittance of the other layers.

7. The reflex light reflecting sheet claimed in claim 2, wherein a printing ink and pigment are used in said printing and have particle sizes ranging from less than $1\mu$ to about $40\mu$.

8. The reflex light reflecting sheet claimed in claim 2, wherein the two sub-layers constituting said surface coating layer are formed from thermosetting resin.

9. The reflex light reflecting sheet claimed in claim 2, wherein the two sub-layers constituting said surface coating layer are different from each other in thickness.

10. The reflex light reflecting sheet set forth in claim 1, wherein said reflective layer is curved in conformity with the shape of said small transparent ball.

* * * * *